United States Patent Office 3,355,352
Patented Nov. 28, 1967

3,355,352
FUNGICIDAL COMPOSITION
Junnosuke Hattori, Toshiaki Ozaki, and Seiji Koike, Toyonaka-shi, Kosuke Yoshioka, Hirakata-shi, and Hiroshi Sugiyama, Ashiya-shi, Japan, assignors to Sumitomo Chemical Company Ltd., Osaka, Japan, a corporation of Japan
No Drawing. Filed July 29, 1963, Ser. No. 298,465
11 Claims. (Cl. 167—33)

This invention relates to a novel fungicidal composition containing, as a main active ingredient, a 2,3-dichloroquinoxaline-6-sulfonamide having the general formula,

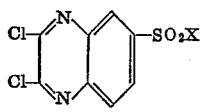

wherein X is selected from the group consisting of

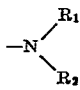

morpholyl, and piperidyl, $R_1$ and $R_2$ being selected from the group consisting of hydrogen atom, alkyl, aralkyl, phenyl, substituted phenyl and cyclohexyl radicals.

Damages of rice crop caused by harmful fungi and insects have been so far a serious problem. To solve the problem, various pesticidal compounds have heretofore been proposed. Among those, however, only some are utilized nowadays. As to the treatment of rice blast, Bordeaux mixture, which is the most popular and effective fungicide, can not be used effectively, because of the decrease of rice yield. Therefore, it is said that organomercury compounds, for example, phenylmercury acetate, etc., are the only ones which are effective and utilizable for that purpose. But, they are unavoidable from various difficulties, such as the high and accumulative toxicities to human beings and domestic animals, the significant phytotoxicities and the high costs.

The present inventors have broadly investigated fungicidal compounds effective to various plant pathogens, particularly to pathogens of rice plant, and found that the quinoxaline derivatives as described above are extremely effective to the plant disease such as rice blast, bacterial leaf blight of rice plant, leaf mold of tomato, anthracnose of grape, cercospora leaf-spot of sugar beet.

Accordingly, an object of the invention is to provide novel fungicidal compositions containing 2,3-dichloroquinoxaline-6-sulfonamide or its derivatives, which are as effective as conventional fungicidal compounds and have low toxicities.

Other objects would be obvious from the following descriptions.

The compounds of the present invention shown in the general formula as above are unknown in the literatures and can be synthesized, for example, by sulfonating 2,3-dihydroxyquinoxaline with not less than 90% sulfuric acid or fuming sulfuric acid to produce 2,3-dihydroxyquinoxaline-6-sulfonic acid, then chlorinating the sulfonated product with phosphorus pentachloride to produce 2,3-dichloroquinoxaline-6-sulfonyl chloride and reacting the resulting chloride with ammonia or a desired organic base in aqueous or non-aqueous conditions to obtain the intended compound, 2,3-dichloroquinoxaline-6-sulfoamide or its derivative.

In the general formula described above, X is selected from the group consisting of

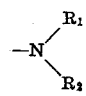

morphoryl, and the piperidyl. In the

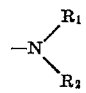

radical, $R_1$ and $R_2$ may be selected, respectively, from the group consisting of hydrogen atom; alkyl radical, preferably lower alkyl radical having 1 to 4 carbon atoms, such as methyl, ethyl, propyl, butyl, and the like radicals; aralkyl radicals such as benzyl, phenethyl, and the like radicals; phenyl radical; substituted phenyl radical having at least one of lower alkyl, lower alkoxy, halogen, and the like substituent; and cyclohexyl radical.

The compounds of this invention which are effective as agricultural fungicidal compositions are, for example, as follows:

(1) 2,3-dichloroquinoxaline-6-sulfonamide,
(2) 2,3-dichloroquinoxaline-6-sulfon-monomethylamide,
(3) 2,3-dichloroquinoxaline-6-sulfon-monoethyamide,
(4) 2,3-dichloroquinoxaline-6-sulfon-mono-n-propylamide,
(5) 2,3-dichloroquinoxaline-6-sulfon-monoisopropylamide,
(6) 2,3-dichloroquinoxaline-6-sulfon-mono-n-butylamide,
(7) 2,3-dichloroquinoxaline-6-sulfon-monoisobutylamide,
(8) 2,3-dichloroquinoxaline-6-sulfon-dimethylamide,
(9) 2,3-dichloroquinoxaline-6-sulfon-diethylamide,
(10) 2,3-dichloroquinoxaline-6-sulfon-di-n-propylamide,
(11) 2,3-dichloroquinoxaline-6-sulfon-diisopropylamide,
(12) 2,3-dichloroquinoxaline-6-sulfon-di-n-butylamide,
(13) 2,3-dichloroquinoxaline-6-sulfonanilide,
(14) 2,3-dichloroquinoxaline-6-sulfon-ortho-chloroanilide,
(15) 2,3-dichloroquinoxaline-6-sulfon-meta-chloroanilide,
(16) 2,3-dichloroquinoxaline-6-sulfon-para-chloroanilide,
(17) 2,3-dichloroquinoxaline-6-sulfonmorpholide,
(18) 2,3-dichloroquinoxaline-6-sulfonpiperydide,
(19) 2,3-dichloroquinoxaline-6-sulfon-ortho-toluidide,
(20) 2,3-dichloroquinoxaline-6-sulfon-meta-toluidide,
(21) 2,3-dichloroquinoxaline-6-sulfon-para-toluidide,
(22) 2,3-dichloroquinoxaline-6-sulfon-cyclohexylamide,
(23) 2,3-dichloroquinoxaline-6-sulfon-metamethoxyanilide,
(24) 2,3-dichloroquinoxaline-6-sulfon-phenethylamide.

The compounds which are used in the present invention are superior to the conventionally available fungicides in that they have very low toxicities and can be used with safety. For example, $LD_{50}$ in oral acute toxicity (mice) of 2,3 - dichloroquinoxaline - 6 - sulfon-dimethylamide is higher than 1000 mg./kg.

These compounds are desirably used in the form of dust or wettable powder as agricultural fungicidal compositions. For preparing dust, at least one of the said compounds may be blended and ground together with at least one of suitable solid diluents, such as talc, kaoline, bentonite, Attaclay, diatomite, vermiculite and active carbon powder, in a concentration of the essential compound within the range from 0.1 to 5% by weight. For preparing wettable powder, at least one of the said fungicidal compounds as essential ingredient may be blended with a wetting agent and at least one of powdered carriers, which are the same compounds as the diluents in the case of preparation of the dust, and they may be well mixed and ground together. In this case, the desirable concentration of the essential ingredient is from about 10% to about 90% by weight. Of course, in both cases of the preparation of dust and wettable powder, the concentration of the essential ingredient may be increased or decreased to meet the purpose. Or, the said compounds of this invention may be used in the form of emulsion, if desired.

Besides, the fungicidal compositions may be prepared by blending with other pesticides, for example, insecticides, miticides, nematoccides or herbicides. Further, they may be also employed in an admixture with fertilizers.

This invention will be illustrated with reference to the following working examples, which are, however, set forth merely by way of illustration and not by way of limitation. In these examples, parts and percentages are by weight unless otherwise identified.

Example 1

2,3-dichloroquinoxaline - 6 - sulfon-dimethylamide and talc are well blended and ground together in proportion of 1:99 by weight to obtain a dust preparation in the concentration of 1% by weight of the essential ingredient.

Example 2

Fifty parts of 2,3-dichloroquinoxaline-6-sulfon-anilide, 7 parts of polyethyleneglycol nonylphenyl ether, as surfactant, and 43 parts of kaoline are well blended and ground together to obtain a wettable powder containing 50% by weight of the essential ingredient.

The followings are to exhibit the effectiveness of the fungicidal compositions of the present invention.

By addition of the wettable powder, prepared as in Example 2, into water, an aqueous dispersion containing the essential ingredient in concentration of 100 p.p.m. by weight is prepared. The dispersion is sprayed over rice plants at the 3 to 4 leaves-stage, cultivated in flower pots of 9 cm. diameter, in an amount of 10 cc. per pot. The next day, spores of rice blast fungus (*Piricularia oryzae*) are inoculated onto the rice plants, and after five days' incubation, spots caused by the fungus are observed. The mean number of spots per leaf is 2 to 3. While, the mean number of spots per leaf is 11.1, in case where the spores are inoculated onto the untreated rice plants.

Thus, the dispersion exhibits extremely powerful preventive effect.

Further, the effects of the fungicidal compounds of this invention are shown in the following table according to the slide germination method (cf. Phytopathology, vol. 37, page 354).

In the table, the figures which exhibit the value of LC 95 are in the unit of p.p.m. The compounds tested are abbreviated by showing the X radical in the general formula.

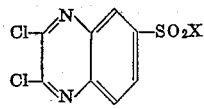

TABLE 1.—SPORE GERMINATION INHIBITION EFFECT

| X radical | Tested fungus *Piricularia oryzae* |
|---|---|
| —$NH_2$ | 5 |
| —$NHCH_3$ | 2 |
| —$NHC_2H_5$ | 0.8 |
| —NH—iso-$C_3H_7$ | 0.8 |
| —NH—n-$C_3H_7$ | 0.5 |
| —NH—iso-$C_4H_9$ | 1 |
| —NH—n-$C_4H_9$ | 0.6 |
| —$N(CH_3)_2$ | 0.1 |
| —$N(C_2H_5)_2$ | 0.5 |
| —$N(iso-C_3H_7)_2$ | 0.8 |
| —$N(n-C_3H_7)_2$ | 5 |
| —$N(n-C_4H_9)_2$ | >100 |
| —NH—⌬ (phenyl) | 0.5 |
| —NH—⌬—$CH_3$ (ortho) | 0.5 |
| —NH—⌬—$CH_3$ (meta) | 0.8 |
| —NH—⌬—$CH_3$ (para) | 0.5 |
| —NH—⌬—Cl (ortho) | 0.6 |
| —NH—⌬—Cl (meta) | 2 |
| —NH—⌬—Cl (para) | 100 |
| —N⌬ (piperidino) | >100 |
| —N⌬O (morpholino) | >100 |
| —NH—⌬H | 0.8 |
| —NH—⌬—$OCH_3$ | 1 |
| —$NHCH_2CH_2$—⌬ | 0.8 |

Example 3

2,3 - dichloroquinoxaline - 6-sulfon-dimethylamide was tested for its fungicidal effects on various plant pathogens according to the agar dilution method.

A solution of 2,3-dichloro-quinoxaline-6-sulfon-dimethylamide diluted with acetone in a concentration as described below was mixed with a warm sterilized potato-agar medium in a ratio of 1 cc. of the solution per 100 cc. of the agar medium. The mixture was poured onto each dish and allowed to solidify. Then, the suspension of the spores of a pathogenic organism was inoculated on each medium. The concentrations of the compounds in the agar media were 10, 5, 2.5, 1.25, 0.63 and 0.32 p.p.m.

The results are presented in the following table in term of inhibitory concentrations of the active component.

TABLE 2.—MINIMUM INHIBITORY CONCENTRATIONS FOR GROWTH OF THE TEST ORGANISMS AT 6 DAYS AFTER INOCULATION
[P.p.m.]

| Organisms | Active components 2,3-dichloroquin-oxaline-6-sulfon-dimethylamide |
|---|---|
| 1. *Ophiobolus myabeanus* | 10 |
| 2. *Fusarium oxysporum* | <10 |
| 3. *Cercospora beticola* | 10 |
| 4. *Glomerella cingulata* | 10 |
| 5. *Cladosporium fulvum* | 10 |
| 6. *Alternaria kikuchiana* | 10 |

What we claim is:

1. A fungicidal composition containing, as the essential active ingredient, an effective fungicidal amount of a 2,3-dichloroquinoxaline-6-sulfon-amide having the formula

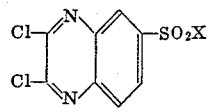

wherein X is selected from the group consisting of

morpholyl, and piperidyl, $R_1$ and $R_2$ being selected from the group consisting of hydrogen atom, lower alkyl, cyclohexyl, benzyl, phenethyl, phenyl, and substituted phenyl having at least one substituent from the group consisting of lower alkyl, lower alkoxy and halogen, in an acetone vehicle.

2. A dust preparation containing, as a fungicidal component, a 2,3-dichloroquinoxaline-6-sulfonamide having the formula

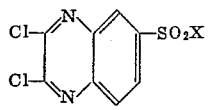

wherein X is selected from the group consisting of

morpholyl, and piperidyl, $R_1$ and $R_2$ being selected from the group consisting of hydrogen atom, lower alkyl, cyclohexyl, benzyl, phenethyl, phenyl and substituted phenyl having at least one substituent from the group consisting of lower alkyl, lower alkoxy and halogen in a powdered carrier.

3. A wettable powder containing a wetting agent, a powdered carrier and as a fungicidal component, a 2,3-dichloroquinoxaline-6-sulfonamide having the formula

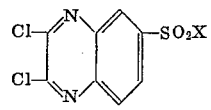

wherein X is selected from the group consisting of

morpholyl, and piperidyl, $R_1$ and $R_2$ being selected from the group consisting of hydrogen atom, lower alkyl, cyclohexyl, benzyl, phenethyl, phenyl and substituted phenyl having at least one substituent from the group consisting of lower alkyl, lower alkoxy and halogen.

4. A method for killing plant pathogens comprising contacting a plant with a 2,3-dichloroquinoxaline-6-sulfonamide having the formula

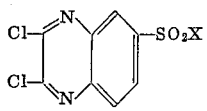

wherein X is selected from the group consisting of

morpholyl, and piperidyl, $R_1$ and $R_2$ being selected from the group consisting of hydrogen atom, lower alkyl, cyclohexyl, benzyl, phenethyl, phenyl and substituted phenyl having at least one substituent from the group consisting of lower alkyl, lower alkoxy and halogen.

5. A method according to the claim 4, wherein said fungus is *Piricularia oryzae*.

6. A method according to the claim 4, wherein said fungus is *Ophiobolus myabeanus*.

7. A method according to the claim 4, wherein said fungus is *Fusarium oxysporum*.

8. A method according to the claim 4, wherein said fungus is *Cercospora beticola*.

9. A method according to the claim 4, wherein said fungus is *Glomerella cingulata*.

10. A method according to the claim 4, wherein said fungus is *Cladosporium fulvum*.

11. A method according to the claim 4, wherein said fungus is *Alternaria kikuchiana*.

References Cited

UNITED STATES PATENTS

| 3,146,161 | 8/1964 | Greene et al. | 167—33 |
| 3,186,903 | 6/1965 | Hatturi et al. | 167—33 |

OTHER REFERENCES

Chem. Abst., vol. 43, p. 3383i, 1949; vol. 40, p. 341, 1946; vol. 57, p. 12508i, 1963.

ALBERT T. MEYERS, *Primary Examiner*.

SAM ROSEN, *Examiner*.

G. A. MENTIS, JEROME GOLDBERG,
*Assistant Examiners*.